US008343607B2

United States Patent
Pokorzynski et al.

(10) Patent No.: US 8,343,607 B2
(45) Date of Patent: Jan. 1, 2013

(54) TRIM PANEL

(75) Inventors: Tony M. Pokorzynski, Holland, MI (US); Heather Rae Springer, West Olive, MI (US); Nels R. Smith, Zeeland, MI (US); Bart W. Fox, Zeeland, MI (US); John C. Hinken, Hudsonville, MI (US); Jeffery T. Stout, Grand Rapids, MI (US); Jason M. Hipshier, Hudsonville, MI (US)

(73) Assignee: Johnson Controls Technology Company, Holland, MI (US)

( * ) Notice: Subject to any disclaimer, the term of this patent is extended or adjusted under 35 U.S.C. 154(b) by 480 days.

(21) Appl. No.: 12/522,135

(22) PCT Filed: Jan. 3, 2008

(86) PCT No.: PCT/US2008/050091
§ 371 (c)(1),
(2), (4) Date: Jun. 15, 2010

(87) PCT Pub. No.: WO2006/091532
PCT Pub. Date: Aug. 31, 2006

(65) Prior Publication Data
US 2010/0279051 A1 Nov. 4, 2010

Related U.S. Application Data

(60) Provisional application No. 60/878,933, filed on Jan. 5, 2007, provisional application No. 60/936,261, filed on Jun. 19, 2007.

(51) Int. Cl.
*B32B 3/10* (2006.01)
*B32B 3/02* (2006.01)

(52) U.S. Cl. .......... 428/43; 428/102; 428/121; 428/174
(58) Field of Classification Search .................. 428/43, 428/102, 172, 174, 121
See application file for complete search history.

(56) References Cited

U.S. PATENT DOCUMENTS
2004/0164531 A1  8/2004  Riha et al.

FOREIGN PATENT DOCUMENTS
WO  WO 2006/060677 A  6/2006
WO  WO 2006/076129 A  7/2006
WO  WO 2006/091532 A  8/2006

OTHER PUBLICATIONS

Chinese Office Action dated Sep. 13, 2011, and its English translation, as received in corresponding China Application No. 20880006015.1, 7 pages.
International Search Report for corresponding PCT Application No. PCT/US2008/050091, dated Jul. 2, 2008, 2 pages.

*Primary Examiner* — Alexander Thomas
(74) *Attorney, Agent, or Firm* — Foley & Lardner LLP

(57) ABSTRACT

An apparatus and method for making a trim panel. The method includes providing a preform laminate including a compressible material sandwiched between a flexible skin and a back skin. Positioning the preform laminate in the mold. Placing an insert with the preform laminate in the mold to created a step to establish a seam location and define a secondary area on the preform laminate. Compressing the compressible material by introducing a molten polymeric material to the mold forming a substrate and bonding the substrate to the preform laminate forming the trim component. The preform laminate folds onto itself and creates a crease along the step to simulate the seam and provide a contour change with the appearance of cushioning in the secondary area, and removing the trim panel component from the mold.

9 Claims, 7 Drawing Sheets

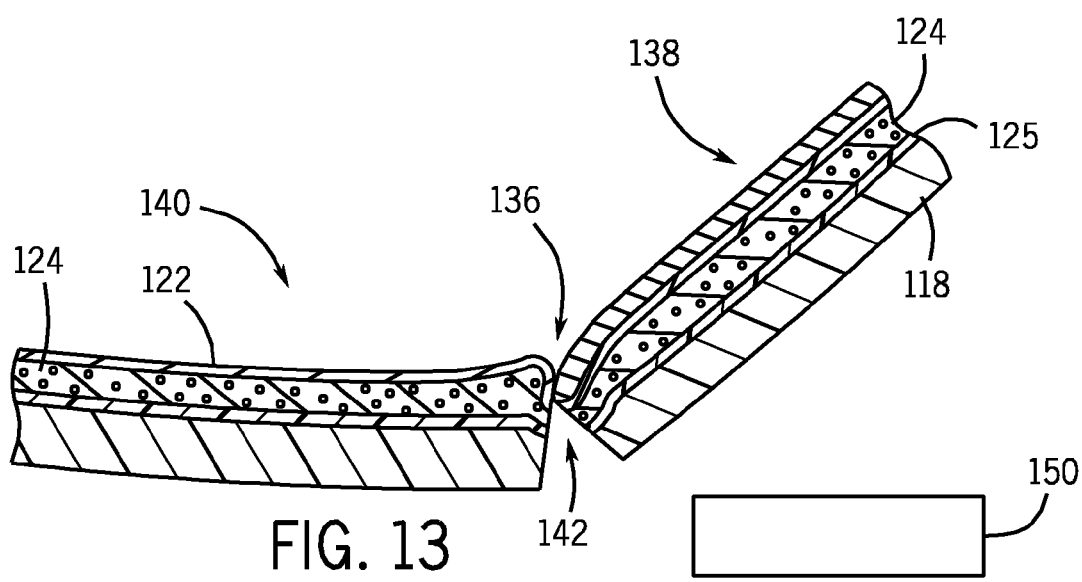

TRIM PANEL

CROSS-REFERENCE TO RELATED APPLICATIONS

This Application is a National Stage of PCT/US2008/050091, filed Jan. 3, 2008, which claims the benefit and PCT International Application claiming priority and the benefit of to U.S. Provisional Application Ser. No. 60/878,933, filed Jan. 5, 2007 and U.S. Provisional Application Ser. No. 60/936,261, filed Jun. 19, 2007. The foregoing applications are incorporated by reference herein in their entirety.

BACKGROUND

The present application relates to the field of molded articles having soft portions with stitching, embroidery and/or other sewn portions (which will collectively be referred to as "stitching"). More specifically, the present application further relates to interior trim panels or structures for vehicles (e.g., automobiles such as cars, trucks, and the like; airplanes, boats, etc.) or other products that include at least one relatively localized deep soft area (e.g., padded or cushioned) portion formed by a partial-mold-behind (PMB) process that may also have stitching (decorative or functional) and be configured to separate from the main body of the product.

Padded or cushioned vehicle interior components may include stitching. Such stitching may be decorative/ornamental and/or functional. The padded or cushioned vehicle interior components may take the form of a trim panel (e.g., instrument panel, door panel, etc.). Such panels typically include a substrate made of a relatively rigid material, a relatively soft core (e.g., a foam layer), and an outer surface or skin. Various methods of providing such cushioning and stitching are known in the art, although such known methods do not provide certain advantageous features and/or combination of features. For example, it is known to add stitching to interior components to the skin (or skin and foam laminate) and then attach the skin to the substrate by a hand or manually wrapping technique. It is also known to apply the stitching after the interior component has been formed (e.g., after the skin, foam, and substrate has been joined). Such padded or cushioned components may also be used in conjunction with devices, such as airbags, located in a dashboard or door panel or the like. However, known methods of applying decorative stitching are labor-intensive or do not provide the desired visual effect of depth that would be provided by a recessed stitch (e.g., "quilting" or cushioning effect that provides contour change in the soft surface). Therefore, such recessed stitching provided by known costly manufacturing processes are typically only available on premium or luxury class vehicles.

The present application further relates to various features and combinations of features shown and described in the disclosed embodiments.

SUMMARY

There is provided a method of forming a trim component in a mold. The method comprises providing a preform laminate comprising a compressible material sandwiched between a flexible skin and a back skin. The preform laminate defines a step at a pre-determined position. Positioning the preform laminate in the mold. Placing an insert with the preform laminate in the mold. Compressing the compressible material by introducing a molten polymeric material to the mold forming a substrate and bonding the substrate to the preform laminate forming the trim component. Wherein the preform laminate folds onto itself and creates a crease along the step to simulate a seam and provide a contour change with the appearance of cushioning in the secondary area, and removing the trim component from the mold.

There is also provided a trim component for a vehicle which comprises a preform laminate piece comprising a compressible material sandwiched between a flexible skin and a back skin. An insert coupled to the preform laminate, wherein the insert abuts a step on the preform laminate wherein the step separates a primary area and a secondary area. A substrate coupled to the preform laminate, wherein a crease along the step simulates a seam and creates a contour change between the secondary area and the primary area.

BRIEF DESCRIPTION OF THE DRAWINGS

FIG. 13 is a cross-sectional view of the preformed piece in FIG. 12 after the deployment of a device, such as an airbag, provided behind the preformed piece.

DETAILED DESCRIPTION

Figure 1:
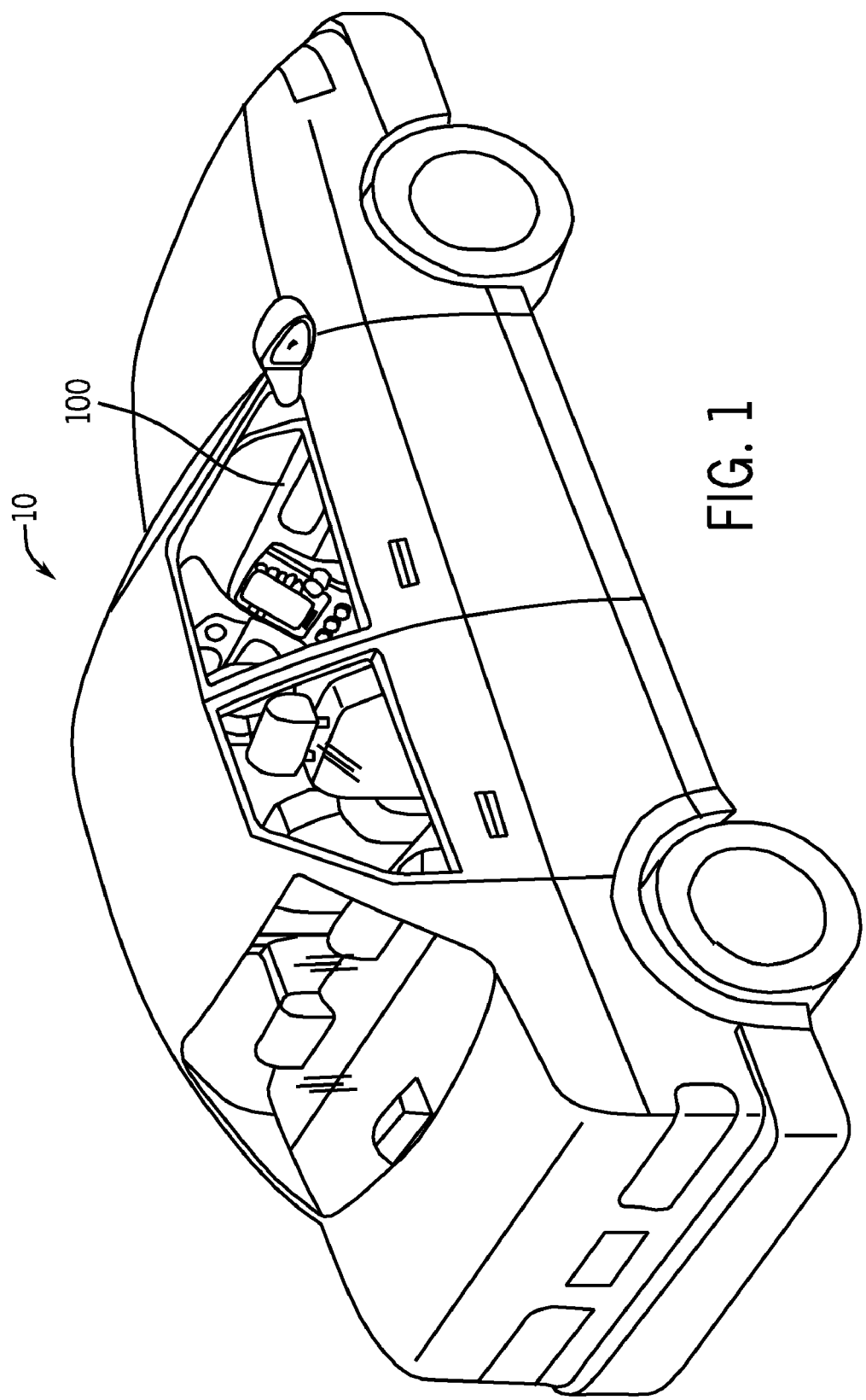
FIG. 1 is a perspective view of a vehicle with an airbag system and a seamless partial mold behind (PMB) interior panel.

Referring to FIG. 1, a vehicle 10 is shown that includes an airbag system and door panels. The airbag system includes an airbag that is configured to inflate and deploy in an impact to protect an occupant of the vehicle. Airbags may be provided for the driver and/or the passengers of the vehicle and may be deployed from a variety of interior components, such as seats, panels or other structures. When activated, the airbag is generally configured to deploy from an interior panel or structure through a deployment door or portion that separates from the main body of the interior panel or structure. While the vehicle 10 is shown as a four-door sedan, it should be understood that the interior panel described in this application may be used in a wide variety of vehicles (e.g., automobiles such as cars, trucks, buses, and the like; airplanes, boats, etc.).

Airbags are typically mounted in housings within a steering wheel, or instrument panel, or another interior panel or structure, such as a door panel. The airbag is typically housed behind a pair of doors or a portion of the panel that is configured to separate from the main body of the panel when the airbag is deployed. The deployment doors or portion is configured to safely allow the airbag to deploy through the interior panel or structure. The deployment doors or portion may be designed to match a decorative theme for the vehicle.

The deployment doors or portion are coupled to the main body of the interior panel or structure by a hinge and are typically configured to separate along a tear seam. The tear seam has a reduced tensile strength relative to the surrounding portions of the interior panel and provides a weakened place in the interior panel that allows a deploying airbag to break through. When the airbag deploys, the tear seam ruptures and allows the airbag to fully inflate. The tear seam may be formed on the front or "A" side of the panel or on the back or "B" side of the panel. The tear seam is preferably provided on the "B" side so that it is hidden by a corresponding seam on the "A" side.

Figure 2:
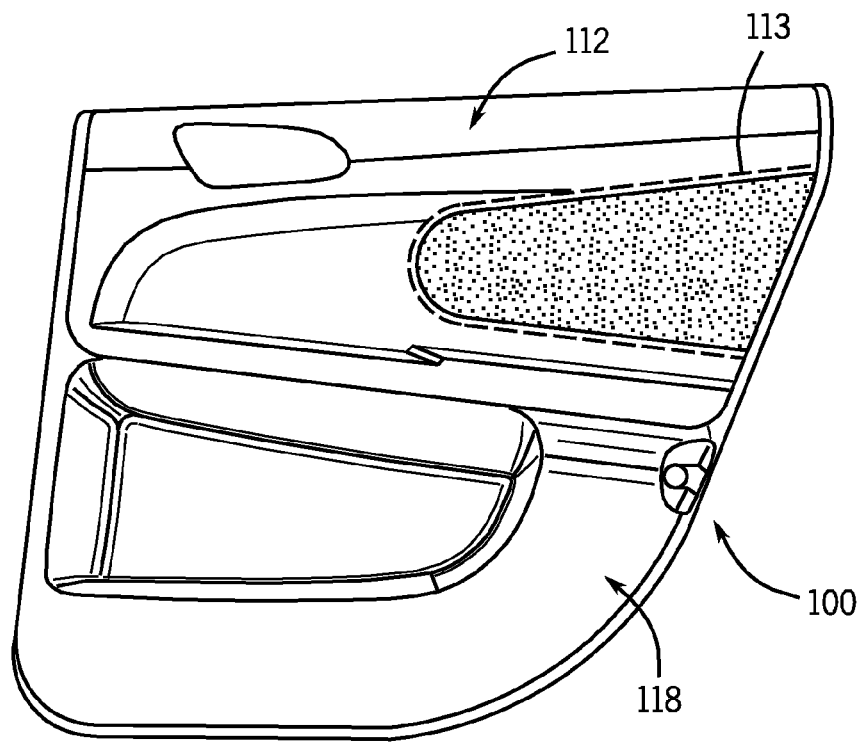
FIG. 2 is an illustration of a vehicle door panel including a faux deck seam.
Figure 3:
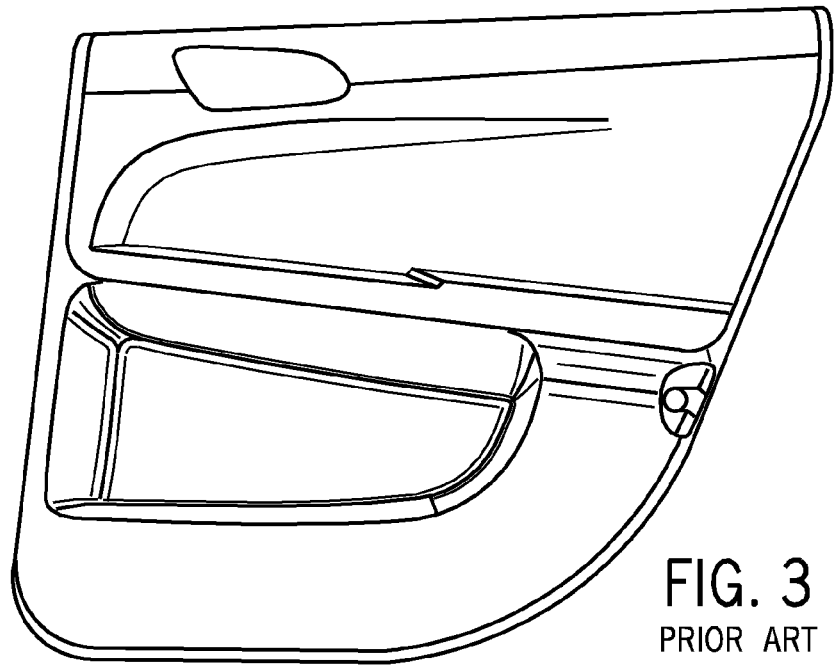
FIG. 3 is an illustration of a prior art a door panel.

FIG. 2 illustrates one exemplary embodiment of trim panel, a component or assembly such as a door panel or other structure for use in a vehicle (e.g., automobiles such as cars, trucks, buses, and the like; airplanes, boats, etc.). Such components may be provided in a wide variety of sizes, shapes, and configurations according to various exemplary embodiments. For example, such components may be utilized in an interior passenger compartment of a vehicle, and may find utility in the form of door panels, dashboards, instrument panels, consoles, sidewall trim, overhead liners, or other vehicle components or portions thereof. The exemplary component is a trim panel 100, a door panel is shown, but other interior components may include the below described features. These components may include for example an instrument panel. The door panel 100 includes one or more localized or discrete portions 112 (e.g., areas, regions, etc.) of softness or cushion that have stitching 113 (e.g., seam, embroidery, and/or other sewn portion, which will collectively be referred to as stitching 113). The door panel is provided with cushioning in portions 112 where a portion of a passenger's body may or is likely to contact the door (e.g., on an armrest, adjacent a window sill, etc.). The door panel 100 may also include one or more portions 118 (e.g., areas, regions, islands, etc.) of hard plastic in areas not typically contacted by a passenger. Stitching 113 may provide any of a variety of or combination of decorative, ornamental, and/or functional purposes.

The methods of providing localized cushioned portions 112 of softness or cushioning in a manner described herein may be utilized to provide components having a wide variety of configurations and uses. Portion 118 may include bezels, accents, appliqués, pull cups, complex geometries (e.g., ball armrests, x, y, z boundaries, etc.), proud (e.g., raised) or recessed regions of cushioning for enhanced aesthetics, or the like.

Figure 4:
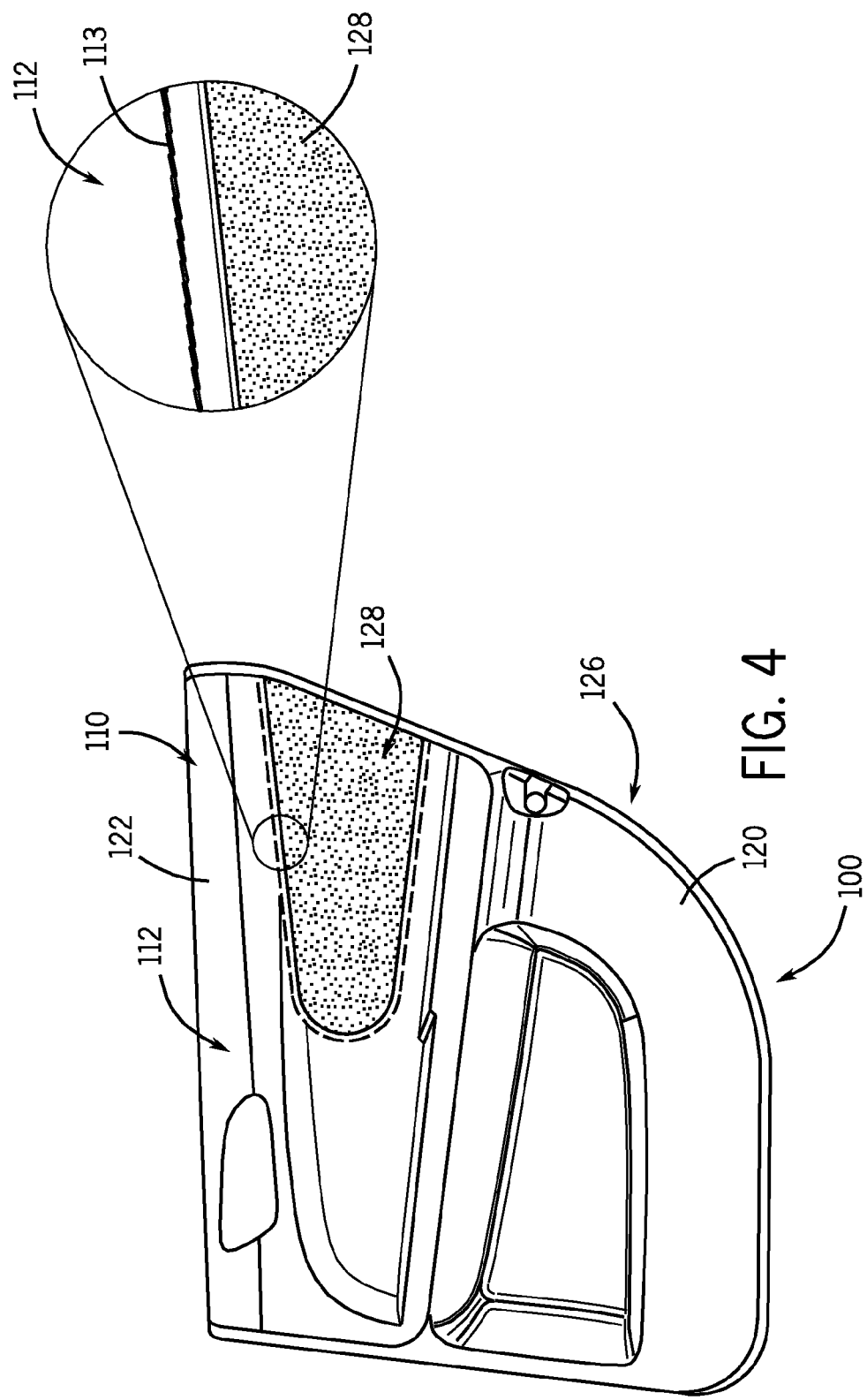
FIG. 4 is an illustration of a seamless door panel fabricated using PMB and including a hard portion and a soft portion with the soft portion including an insert with a simulated stitch.
Figure 5:
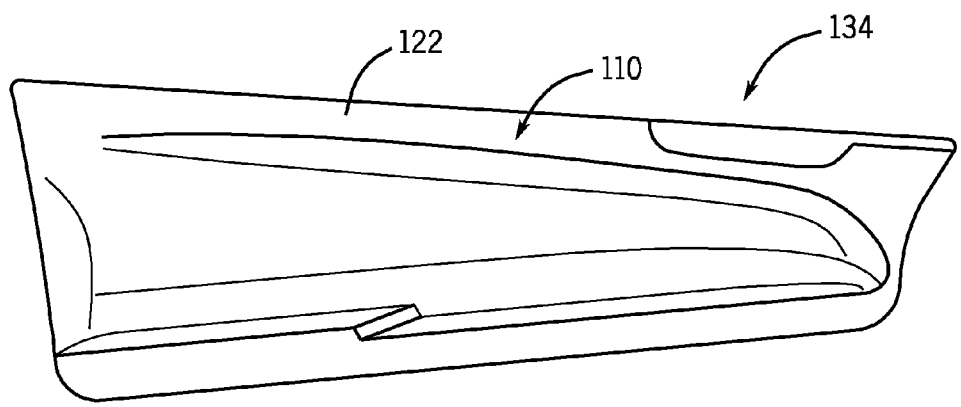
FIG. 5 is an illustration of a preformed piece for a door panel that includes one of a TPO and polyvinylchloride top skin, a polyolefin foam center layer and a thermoplastic polyolefin (TPO) back skin.
Figure 6:
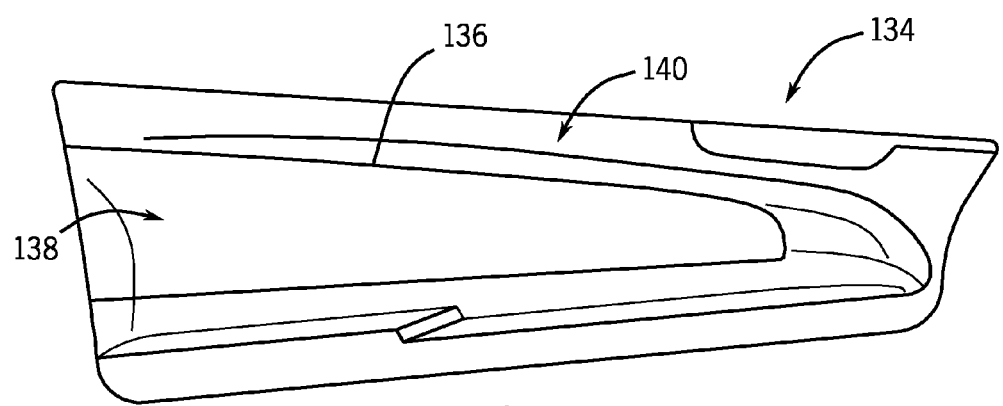
FIG. 6 is an illustration of a preformed piece for a door panel that includes a step formed by an insert placed into a negative forming tool.

Referring to FIGS. 2 and 4, door panel 100 includes a member or element in the form of a relatively rigid substrate, base, or stratum (referred to herein as a "substrate" 120). Cushioned portion 112 is located adjacent or proximate to at least a portion of substrate 120, and comprises a coverstock 110, also referred to herein as a preform piece 134, coupled to substrate 120. According to an exemplary embodiment, preform piece 134 includes a skin 122, a filler or compressible material 124 provided intermediate or between skin 122 and a back skin 125. According to exemplary embodiments, portions of skin 122 may be in direct contact with substrate 120 (i.e., no compressible material 124 between skin 122 and substrate 120), while other portions of skin 122 may be separated from substrate 120 by compressible material 124 and back skin 125. In this manner, selectively varying amounts or degrees of softness or cushioning are provided at one or more localized regions while retaining the look and feel of the skin even in those regions not provided with the additional cushioning of compressible material 124. The particular design chosen may depend on any of a variety of factors, including the desired look and feel of the outer surface of the panel, materials costs, ease of manufacturing, etc.

According to an exemplary embodiment, the cushioned portion 112 as part of the preform piece 134 is disposed on or over at least a portion of substrate 120. Skin 122 forms at least a portion of the exterior surface (e.g., the portion visible from a passenger compartment, which is typically referred to as the "A" surface or side) of the component. According to an exemplary embodiment, a portion 126 of substrate 120 not covered by coverstock 110 may also form a portion of the exterior surface ("A" surface).

The preform piece 134 is prepared, typically by a molding process, as a trilaminate preform piece. The top skin 122 can be composed of polyvinylchloride (PVC) or a thermoplastic polyolefin. The center layer 124 is typically a polyolefin foam that is compressible. A back skin 125 is typically a thermoplastic polyolefin. The three layers are introduced into a mold and thermally formed to a desired configuration.

Figure 7:
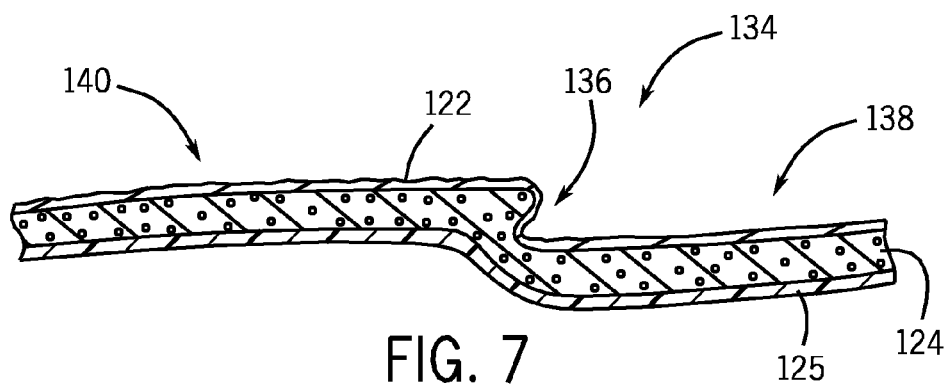
FIG. 7 is a cross-sectional view of a portion of a preformed piece of a panel including one of a thermoplastic polyolefin (TPO) and polyvinylchloride top skin, a polyolefin foam center layer and a TPO back skin.
Figure 8:
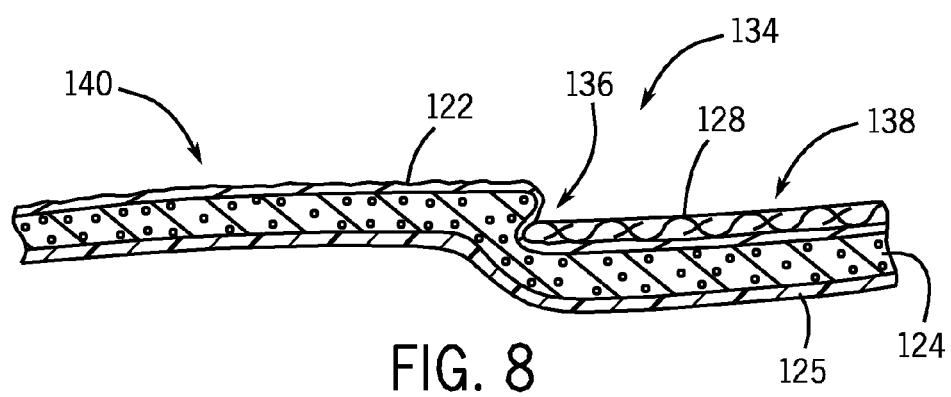
FIG. 8 is the cross-sectional view of the preformed piece illustrated in FIG. 7 with a secondary cloth material (insert) installed in a secondary area.
Figure 9:
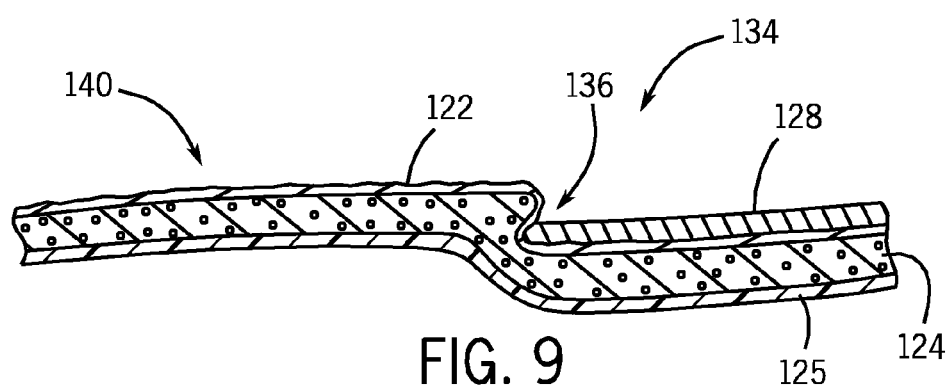
FIG. 9. is a cross-sectional of the preformed piece illustrated in FIG. 7 with a secondary leather material (insert) installed in the secondary area.

As illustrated in the figures, the preform piece 134 is a part of a vehicle door panel 100. During the molding process of the preform piece 134, an insert (not shown) is placed in the negative forming tool of the mold to create a sharp creasing detail 136 at a preselected position. Alternatively, the step can be created by configuring the negative forming tool. A cross-sectional view of the perform piece is shown in FIGS. 7, 8, 9, 10, 11 and 12 the perform piece 134 may include a crease 136 as well as a trilaminate structure. As shown in FIG. 7, a primary area 140 and a secondary area 138 on the preform piece 134 are defined by the crease 136. As shown in FIGS. 8 and 9, a secondary material 128, also referred to as an insert, can be installed in the secondary area 138 during the molding process of the preform piece 134. In FIG. 8, the secondary material is cloth and in FIG. 9, the secondary material is a leather. The secondary area 138 may also include a coating, for example paint.

Figure 10:
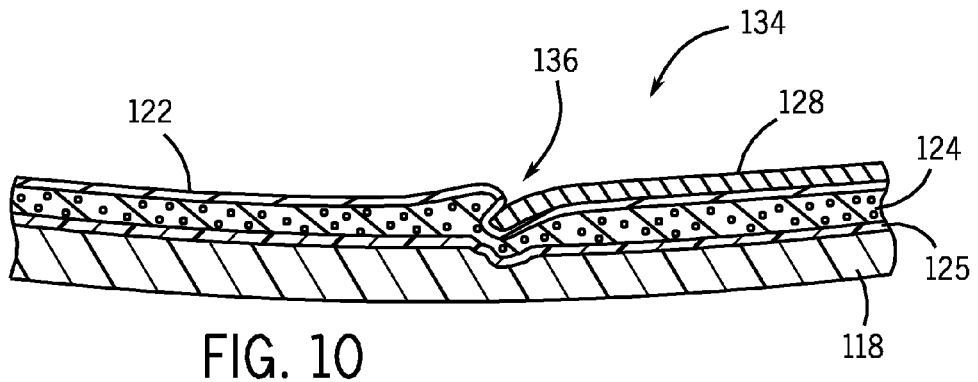
FIG. 10 is a cross-sectional of the preformed piece with a secondary material installed in the secondary area and with the additional injection molded material molded behind the preformed piece.

By installing the insert in the negative forming tool, a sharp step, for example 3 mm deep, may be created in the preform piece 134. That detail is created in the preform piece as seen on the outer skin 122. During the molding process, as the material behind the skin is injected into the mold, the mismatched step folds onto itself and creates a crease 136 along the step. The crease in the molded part gives the appearance of one skin folded over another skin. Different graining features in the top skin 122 in the primary area and the secondary area can give the appearance of different materials when in fact it is of the same material. It is also contemplated that the secondary area can be painted or coated to give the appearance of a different material. As shown in FIG. 10, the pressure exerted on the preform piece 134 during the molding process closes up the crease 136 and makes an extremely tight seam.

Figure 11:
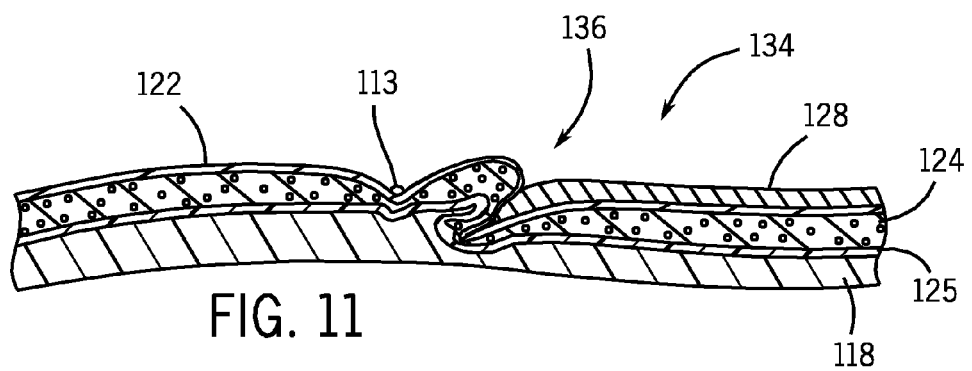
FIG. 11 is a cross-sectional view of the door panel illustrated in FIG. 2 with a simulated deck seam and stitch adjacent to a leather insert in the secondary area.

As shown in FIG. 11, a secondary feature can be added to the preformed piece 134 by adding a stitch feature 113 during the formation process. After formation of the preform piece 134, the substrate 118 may be molded to complete the panel 100. A cross-sectional view of such structure is shown in FIGS. 10 and 11.

Any of a variety of configurations may be utilized for the interface of the edges of the skin and the substrate. According to an exemplary embodiment, a flange is formed on skin 122 by forming in a vacuum mold (e.g., to provide an edge of the skin with a "folded back" configuration to form a protrusion). Substrate 120 is then molded around flanges of skin 122 (and compressible material 124). According to a preferred embodiment, preform piece 134 and substrate 120 are coupled together such that a relatively airtight and/or watertight seal is provided.

Substrate 120 provides a base or support layer for preform piece 134, including the skin 122, and compressible material 124 and back skin 125. Substrate 120 may be made of any suitable material, including any of a variety of polymers (e.g., polypropylene, polyethylene, copolymers, compressed fibers, TPO, filled plastics, polycarbonate ABS blends, ABS, or any of a variety of other materials). Substrate 120 may be formed in any of a wide variety of shapes, sizes, and configurations (see, e.g., FIG. 2, which shows door panel 100 according to an exemplary embodiment having regions of localized cushioning), and may include a variety of other features (e.g., apertures for door locks and handles, molded-in designs, etc.). Substrate 120 may be formed by any of a variety of methods, including injection molding, thermoforming, or the like. Portions of substrate 120 that form part of the "A" surface may have any of a variety of textures, colors, indicia, features, and the like. Substrate 120 may be a stand-alone component or may be a component in a larger assembly (e.g., the substrate may be an entire door panel or may be a portion thereof, etc.).

According to an exemplary embodiment, skin 122 is made of a relatively soft or flexible material comprising a polymeric material (e.g., a thermoplastic olefin (TPO), polyurethane, polyvinylchloride (PVC), etc.). According to other exemplary embodiments, skin 122 may be made of other materials, including textiles such as cloth, leather, composite materials, layered materials such as a secondary material 128, also referred to as an insert (e.g., a layer of leather applied above a polymeric material layer), etc. Preform piece 134 (e.g. PVC or TPO top skin 122, compressible material 124, and TPO back skin 125) may have a size, shape, and configuration that is adapted or configured to features included in substrate 120. Skin 122 may be manufactured or produced utilizing any of a variety of process. According to an embodiment, skin 122 (e.g., a TPO sheet) is thermoformed (e.g., vacuum formed, pressure formed, etc.) and then trimmed to a desired shape or configuration. In a vacuum molding process, a pre-cut or formed sheet of polymeric material is provided in a mold and heated to soften the material. A vacuum is applied to the mold, which draws the softened polymeric material toward the walls of the mold. The polymeric material then cools and maintains the shape defined by the mold walls. The formed sheet may also be trimmed for desired size. According to an alternative embodiment, the skin is formed by a slush molding process wherein thermoplastic material in a liquid or powdered form is introduced into a temperature-controlled mold to form a viscous skin adjacent to the mold walls; once the skin is formed, the excess material is removed from the mold and the skin is allowed to cure and cool, after which the skin is removed from the mold. According to other alternative embodiments, preform piece 134 is manufactured according to various other methods. For example, the preform piece 134 may be formed in an injection molding process, an extrusion process, a casting process (e.g., gravity casting), or any other suitable process for forming a polymeric skin.

According to an exemplary embodiment, compressible material 124 is coupled (e.g., bonded, fused, adhered, fastened, attached, etc.) to skin 122 and located in between skin 122 and back skin 125 to act as a "filler" or soft layer. It is intended that such material acts as a relatively soft or cushioning material to provide the cushioned member with at least a portion of its relatively soft or cushioned characteristic. According to a preferred embodiment, the compressible material is a polymeric material such as a foam material (e.g., urethane foam, closed cell foam, open celled foam, etc.). The back skin 125 can be any suitable material compatible with the compressible material 124 and the substrate material 120. According to an alternative embodiment, stitching 113 is applied to skin without having a compressible 124 (i.e., to provide a different level of softness). As such, stitching 113 may be provided to skin 122 with compressible material, skin 122 without compressible material 124; and the thickness of the skin layer, the compressible material layer and the back skin may be varied according to the desired softness.

Stitching 113 is applied to skin 122 or (preferably) to a laminate of skin 122, compressible material 124 and back skin 125 proximate a crease detail 136. Stitching 113 may be applied by any of a variety of conventional techniques (e.g., hand sewn, machine sewn, etc.). Stitching 113 may be made from any of a variety of materials, such as fabric, textile (e.g., cotton), polymer (e.g., nylon, etc.), or other material which may or may not melt or liquefy upon application of heat. Applying stitching 113 to the preform piece 134 including an insert 128 before substrate 120 is molded is intended to recess stitching 113 in skin 122 and/or compressible material 124. During molding of substrate 120, compressible material 124 is compressed by the injection of the molten resin that forms substrate 120 (see FIGS. 9 and 10). Stitching 113 compresses less (and preferably substantially less) than compressible material 124 and/or skin 122 such that skin 122 and compressible material 124 are forced around stitching 113. During the molding process, substrate 120 bonds (e.g., mechanically and/or chemically (e.g., thermally or fusion)) to preform piece 134. When the molded article is removed from the mold tool or fixture, compressible material 124 expands (and around stitching 113) to provide the visual effect that stitching 113 is recessed (e.g., providing a "quilting" or a contour change with the appearance that that portion of the trim panel is cushioned).

In an exemplary embodiment, a device 150, such as an airbag system, is installed in a volume space behind the trim panel 100, for example in an instrument panel or a door panel. The trim panel 100 is configured to rupture to allow the device to deploy.

Figure 12:
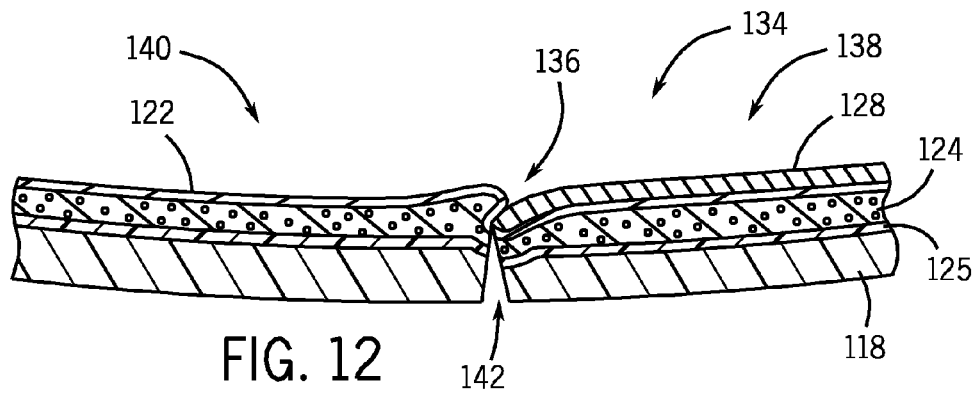
FIG. 12 is a cross-sectional view of the preformed piece in FIG. 8 with a tear seam formed by scoring the injection molded material, the back skin, the foam area, and the top skin.

As shown in FIG. 12, a tear seam 142 is formed along seam 136 between the primary area 140 and secondary area 138. Tear seam 142 is formed by scoring or cutting substrate 118, back skin 125, and filler 124 and skin 122. According to an exemplary embodiment, tear seam 142 is formed with a laser scoring process but may be formed by any suitable scoring process (e.g., mechanical scoring, etc.). Tear seam 142 is an area between secondary area 138 and primary area 140 that allows secondary area 138 (e.g., the deployment door or portion) to move relative to primary portion 140 during the deployment of the device 150, for example an airbag system. The deployment of the secondary portion 138 allows the airbag to inflate or deploy into the interior of the vehicle as shown in FIG. 13. Seam 136 provides an overhang that hides tear seam 142 and any deformation of skin 122 that may be caused by secondary area 138 shifting slightly relative to primary area 140. Secondary area 138 may be configured to deploy in a variety of manners to allow the airbag to inflate into the interior of the vehicle. For example, tear seam 142 may be configured to act as a hinge or may be configured to rupture under the forces of the inflating airbag. A single deployment door may be provided on panel 100 for the airbag or two or more deployment doors may be provided that cooperate to allow the airbag to inflate into the interior of the vehicle.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature It is also important to note that the construction and arrangement of the elements of the vehicle trim panel as shown in the preferred and other exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, the compressible material may be coupled to the skin and positioning the skin and compressible material in a mold; and forming a rigid substrate around the skin and compressible material providing a first soft region wherein the compressible material is disposed between the skin and the substrate so that a first soft region is defined by the compressible material. Stitching may be provided on either the portion of the skin adjacent the first shot, or the second shot, or the third shot, or the like. The substrate may comprises a molded polymer material such as a thermoplastic. The skin may comprise a thermoplastic olefin and be formed by vacuum forming and trimming a sheet. The compressible material may comprise a foam material such as a closed cell foam. The skin may comprise flanges so that the substrate can be molded to at least partially encapsulate the flanges. A second soft region may be defined by a portion of the skin in direct contact with the substrate (e.g., the compressible material is not disposed between the skin and the substrate). The molding technique may also be employed in other application besides for vehicle interiors. Accordingly, all such modifications are intended to be included within the scope of this application. The order or sequence of any process or method steps may be varied or re-sequenced according to alternative embodiments. Other substitutions, modifications, changes and/or omissions may be made in the design, operating conditions and arrangement of the preferred and other exemplary embodiments.

What is claimed is:

1. A trim component for a vehicle comprising:
a preform laminate piece comprising a compressible material sandwiched between a flexible skin and a back skin;
an insert coupled to the preform laminate, wherein the insert abuts a step on the preform laminate wherein the step separates a primary area and a secondary area; and
a substrate coupled to the preform laminate, wherein a crease along the step simulates a seam and creates a contour change between the secondary area and the primary area.

2. The trim component of claim 1 including a stitch feature positioned along the seam.

3. The trim component of claim 2 wherein the stitch feature is recessed.

4. The trim component of claim 2 wherein the stitch feature is applied to the flexible skin.

5. The trim component of claim 2 wherein the stitch feature is applied to the preform laminate.

6. The trim component of claim 1 including a tear seam defined by a score line in the substrate and preform laminate.

7. The trim component of claim 6 wherein a hinge is defined by the score line.

8. The trim component of claim 6 wherein the tear seam is configured to rupture along the score line.

9. The trim component of claim 6 wherein the tear seam is provided between the primary area and the secondary area.

* * * * *

UNITED STATES PATENT AND TRADEMARK OFFICE
CERTIFICATE OF CORRECTION

PATENT NO.         : 8,343,607 B2
APPLICATION NO.    : 12/522135
DATED              : January 1, 2013
INVENTOR(S)        : Tony M. Pokorzynski et al.

Page 1 of 1

It is certified that error appears in the above-identified patent and that said Letters Patent is hereby corrected as shown below:

ON THE TITLE PAGE

Item (87), PCT Pub. No., delete "WO2006/091532" and insert --WO2008/086081--

Item (87), PCT Pub. Date, delete "Aug. 31, 2006" and insert --Jul. 17, 2008--

Signed and Sealed this
Fifteenth Day of April, 2014

Michelle K. Lee
*Deputy Director of the United States Patent and Trademark Office*